(12) United States Patent
Liu

(10) Patent No.: US 8,979,116 B1
(45) Date of Patent: Mar. 17, 2015

(54) RETRACTABLE FRAME STRUCTURE FOR BABY TRAILER

(71) Applicant: Cheh-Kang Liu, Taipei (TW)

(72) Inventor: Cheh-Kang Liu, Taipei (TW)

( * ) Notice: Subject to any disclaimer, the term of this patent is extended or adjusted under 35 U.S.C. 154(b) by 0 days.

(21) Appl. No.: 14/300,422

(22) Filed: Jun. 10, 2014

(51) Int. Cl.
*B62B 7/02* (2006.01)
*B62K 27/02* (2006.01)

(52) U.S. Cl.
CPC ...................................... *B62K 27/02* (2013.01)
USPC ...................................................... 280/656

(58) Field of Classification Search
CPC ........................................................ B62B 7/02
USPC ......... 280/33.993, 47.38, 639–644, 647–650, 280/658
See application file for complete search history.

(56) References Cited

U.S. PATENT DOCUMENTS 7,241,265 B2 * 7/2007 Cummings et al. ............ 600/300
8,444,173 B1 * 5/2013 Liu ................................ 280/656

* cited by examiner

*Primary Examiner* — John Walters
*Assistant Examiner* — James Triggs
(74) *Attorney, Agent, or Firm* — Jackson IPG PLLC

(57) ABSTRACT

A retractable frame structure for baby trailer includes a rigid base frame, a bottom frame bar horizontally movable in and out of a front side of the rigid bottom, a first locking device for selectively locking the bottom frame bar to the base frame in the extended or received position, a backrest, a top frame bar vertically movable in and out of a top side of the backrest, and a second locking device for selectively locking the top frame bar to the backrest in the extended or received position.

8 Claims, 16 Drawing Sheets

RETRACTABLE FRAME STRUCTURE FOR BABY TRAILER

BACKGROUND AND SUMMARY OF THE INVENTION

The present invention relates to a baby trailer and more specifically, to a retractable frame structure for baby trailer, which comprises a rigid base frame, a bottom frame bar horizontally slidably mounted in the base frame and selectively lockable in the extended or received position, a backrest, and a top frame bar vertically slidably mounted in the backrest and selectively lockable in the extended or received position.

U.S. Pat. Nos. 7,341,265 and 8,444,173 disclose a baby trailer that allows adjustment of the bottom frame bar between an extended position and a received position. However, because the seat supported on the bottom frame bar is a flexible fabric material, it will be forced to curve downwards when a baby or child sits thereof, causing the baby or child to feel uncomfortable. When the baby trailer is moved over a large stone or any other external object on the road, the downwardly curved seat can hit the external object, leading to an injury accident. In order to assure a high level of stability and sitting comfort, the seat is preferably made of a rigid or hard material and attached with a soft or flexible pad or covering. Further, the frame structures of conventional baby trailers are not highly retractable or collapsible to save the storage space. In consequence, conventional baby trailers are not conveniently for packaging, delivery or storage.

The present invention has been accomplished under the circumstances in view. It is therefore the main object of the present invention to provide a retractable frame structure for baby trailer, which is highly retractable to reduce the storage space, saving the packaging and delivery costs. It is another object of the present invention to provide a retractable frame structure for baby trailer, which assures a high level of sitting comfort and moving safety and operational convenience.

To achieve these and other objects of the present invention, a retractable frame structure for baby trailer comprises a rigid base frame, a bottom frame bar horizontally movable in and out of a front side of the rigid bottom, first lock means for selectively locking the bottom frame bar to the base frame in the extended or received position, a backrest, a top frame bar vertically movable in and out of a top side of the backrest, and a second lock means for selectively locking the top frame bar to the backrest in the extended or received position.

DETAILED DESCRIPTION OF THE INVENTION

Figure 1:
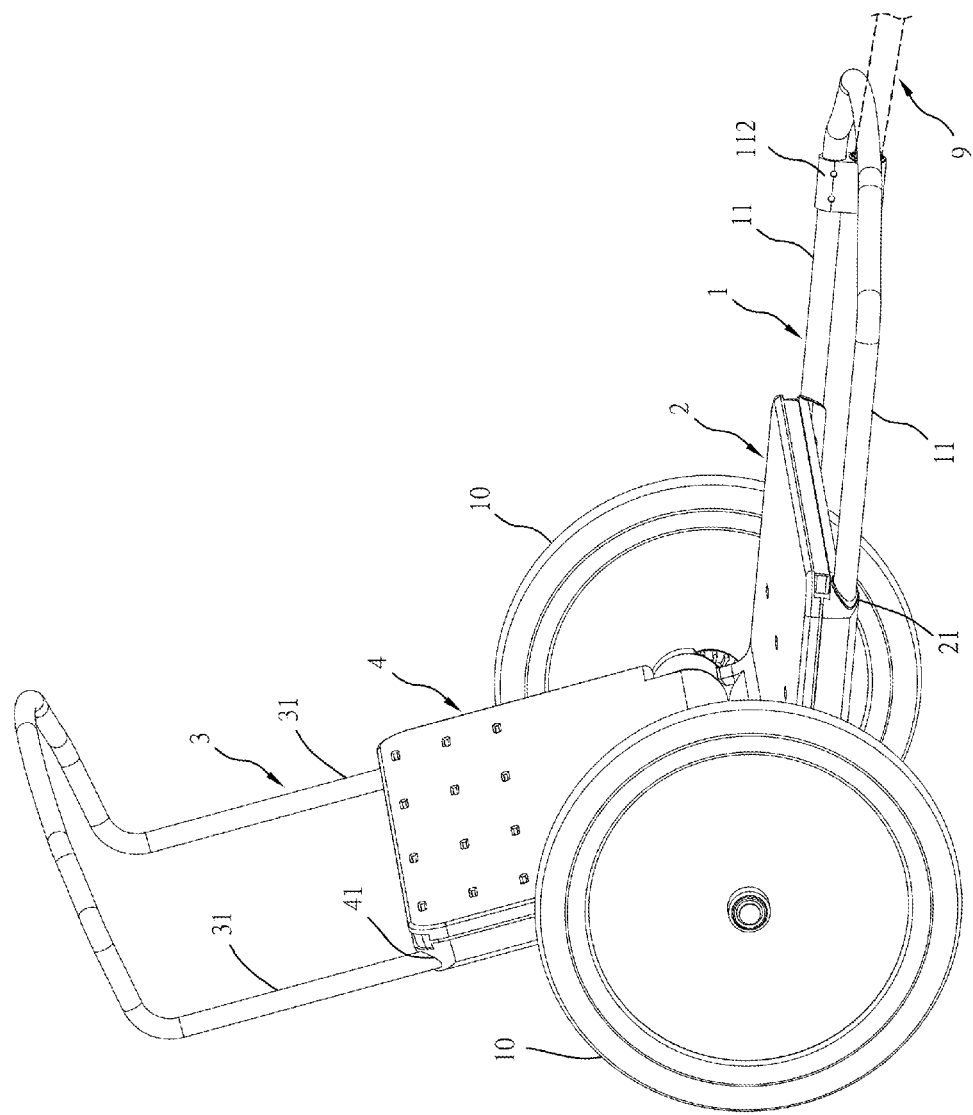
FIG. 1 is an elevational view of a retractable frame structure for foldable baby trailer in accordance with the present invention.
Figure 2:
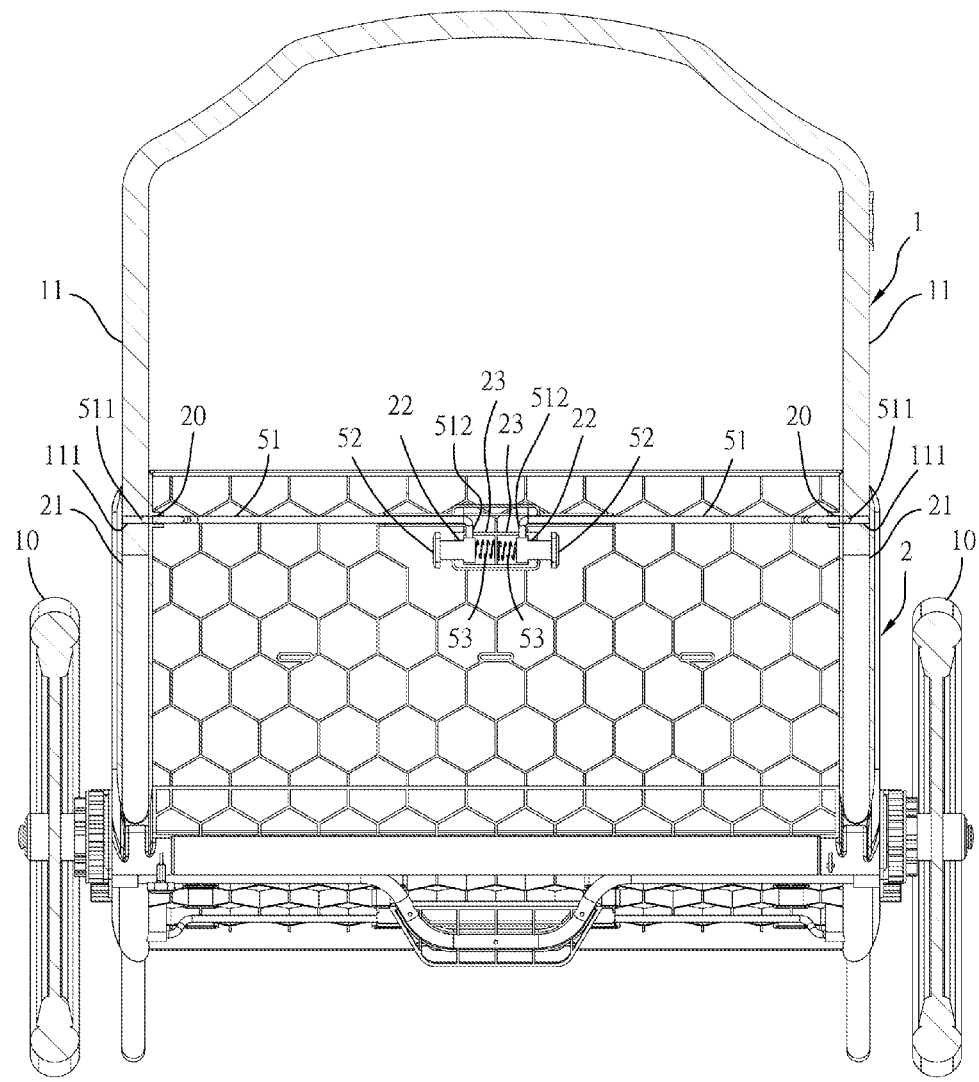
FIG. 2 is a schematic sectional view of the present invention, illustrating the bottom frame bar extended out of the base frame.
Figure 3:
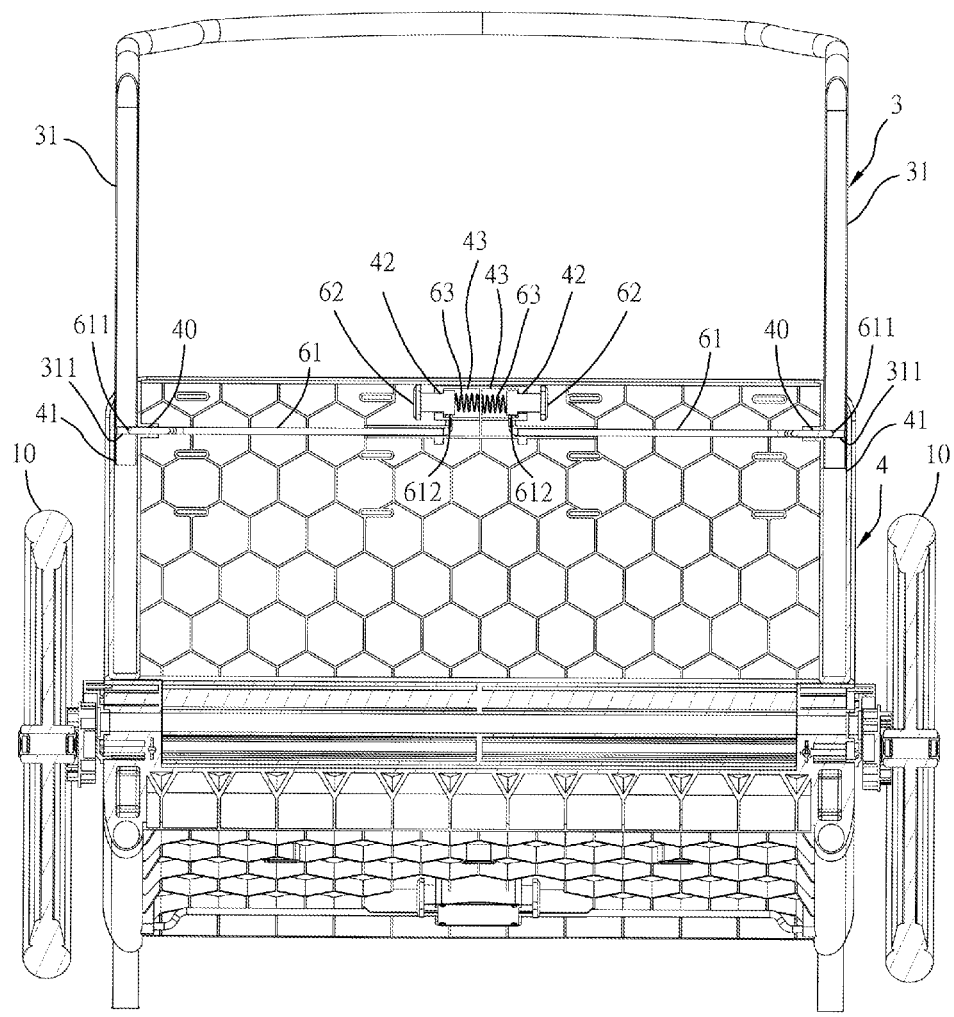
FIG. 3 is a schematic sectional view of the present invention, illustrating the top frame bar extended out of the backrest.

Referring to FIGS. 1-7, a retractable frame structure for baby trailer is shown. The retractable frame structure comprises:

a bottom frame bar 1 comprising opposing left and right frame bar portions 11, a plurality of positioning holes 111 located in each of the left and right frame bar portions 11 and spaced along the length thereof (see FIG. 2), a pivot holder 112 located at one of the left and right frame bar portions 11 for the connection of one end of a tow bar 9 that has an opposite end thereof connected to a bicycle (not shown);

a base frame 2 made of a rigid material and pivotally connected between two wheels 10, comprising two sliding holes 21 arranged in parallel at opposing left and right sides thereof (see FIG. 1, FIG. 2, FIG. 4 and FIG. 5) for receiving the left and right frame bar portions 11 of the bottom frame bar 1 respectively in such a manner that the bottom frame bar 1 can be moved in and out of the sliding holes 21 of the base frame 2 between a received position and an extended position, and first lock means for locking the bottom frame bar 1 to the base frame 2;

a top frame bar 3 comprising opposing left and right frame bar portions 31, a plurality of second positioning holes 311 located in each of the left and right frame bar portions 31 and spaced along the length thereof (see FIG. 3); and a backrest 4 made of a hard material and pivotally connected with a bottom side thereof to a rear side of the base frame 2 and turnable relative to the base frame 2 between a non-operative horizontal position and an operative vertical position, comprising two second sliding holes 41 arranged in parallel at opposing left and right sides thereof (see FIG. 1, FIG. 3 and FIG. 6) for receiving the left and right frame bar portions 31 of the top frame bar 3 respectively in such a manner that the top frame bar 3 can be moved in and out of the second sliding holes 41 of the backrest 4 between a received position and an extended position, and second lock means for locking the top frame bar 3 to the backrest 4.

The aforesaid first lock means comprises two lock pins 51 (see FIG. 2, FIG. 4 and FIG. 5) having respective one ends 511 thereof respectively insertable through respective locating holes 20 in the base frame 2 (see FIG. 2) into the positioning holes 111 of the opposing left and right frame bar portions 11 of the bottom frame bar 1 to lock the base frame 2 and the bottom frame bar 1 together.

Further, the lock pins 51 have respective opposite ends 512 thereof respectively connected with a respective finger knob 52 (see FIG. 2, FIG. 4 and FIG. 5) that is movably mounted in a respective sliding groove 22 in the base frame 2 and supported on a respective spring member 53 in a respective spring hole 23 in the base frame 2. When the user presses the finger knobs 52 against the respective spring members 53, the lock pins 51 are moved inwardly toward each other to disengage their respective one ends 511 from the corresponding positioning holes 111 in the frame bar portions 11 of the bottom frame bar 1 (see FIG. 4). When the user releases the fingers from the finger knobs 52, the spring members 53 are released from the constraint to return the finger knobs 52, moving the respective lock pins 51 outwardly away from each other, and thus the lock pins 51 are returned to the locking position.

The aforesaid second lock means comprises two lock pins 61 (see FIG. 3 and FIG. 6) having respective one ends 611 thereof respectively insertable through respective second locating holes 40 in the backrest 4 (see FIG. 3 and FIG. 6) into the second positioning holes 311 of the opposing left and right frame bar portions 31 of the top frame bar 3 to lock the backrest 4 and the top frame bar 3 together.

Further, the second lock pins 61 have respective opposite ends 612 thereof respectively connected with a respective second finger knob 62 (see FIG. 3 and FIG. 6) that is movably mounted in a respective second sliding groove 42 in the backrest 4 and supported on a respective second spring member 63 in a respective second spring hole 43 in the backrest 4. When the user presses the second finger knobs 62 against the respective second spring members 63, the second lock pins 61 are moved inwardly toward each other to disengage their respective one ends 611 from the corresponding second positioning holes 311 in the frame bar portions 31 of the top frame bar 3. When the user releases the fingers from the second finger knobs 62, the second spring members 63 are released from the constraint to return the second finger knobs 62, moving the respective second lock pins 61 outwardly away from each other, and thus the second lock pins 61 are returned to the locking position.

Figure 4:
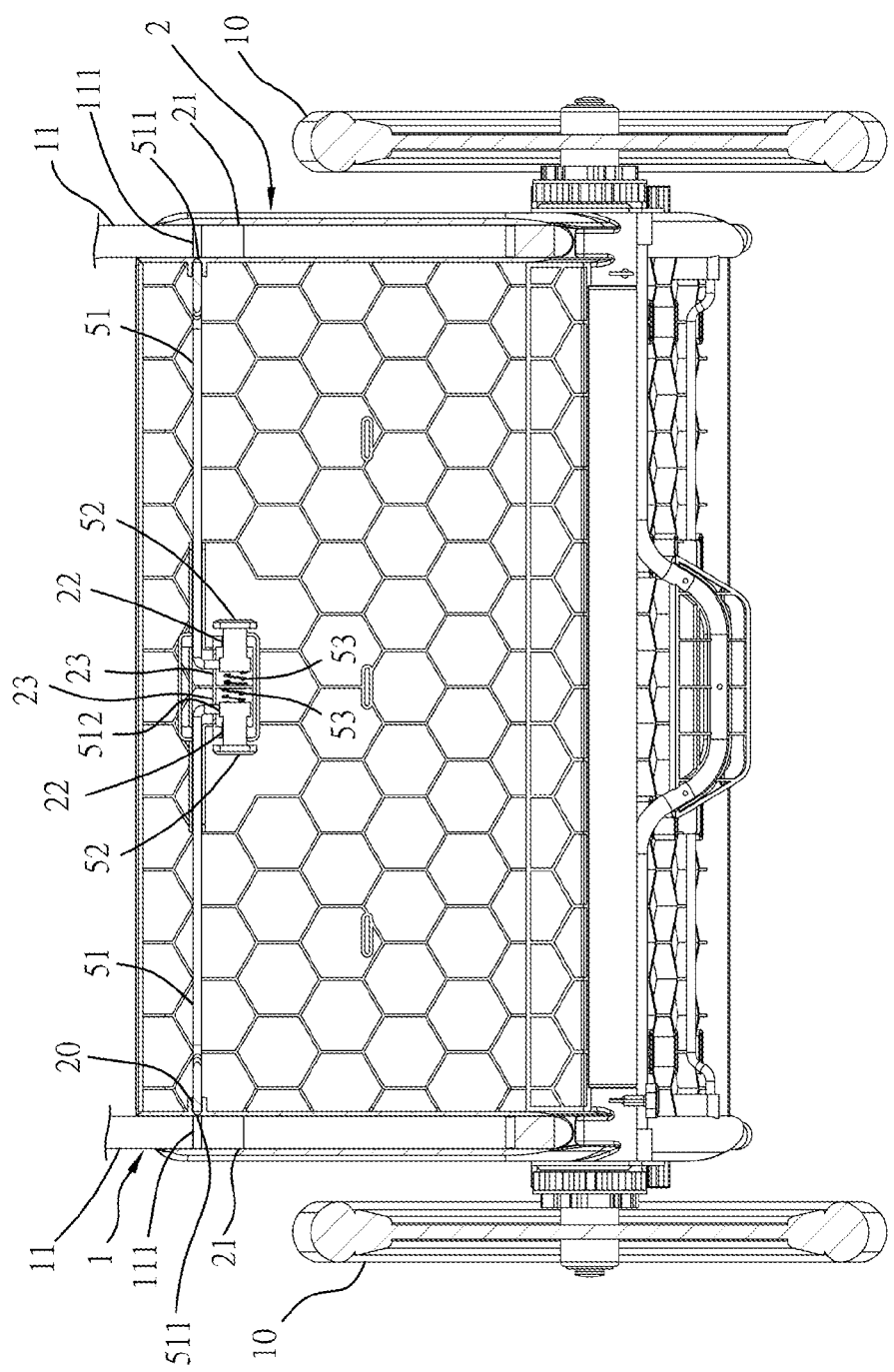
FIG. 4 is a schematic sectional view of the present invention, illustrating the finger knobs of the first lock means pressed and the respective spring members compressed.
Figure 5:
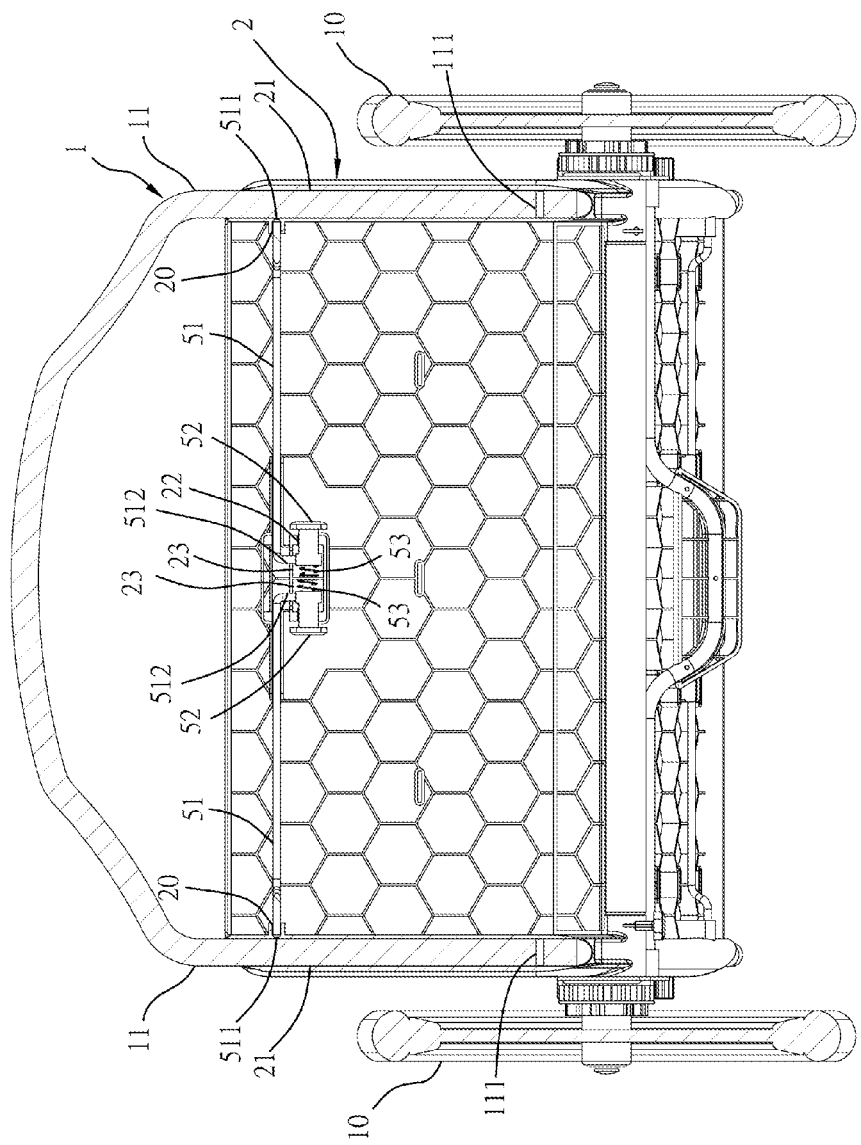
FIG. 5 is a schematic sectional view of the present invention, illustrating the bottom frame bar received in the base frame.
Figure 6:
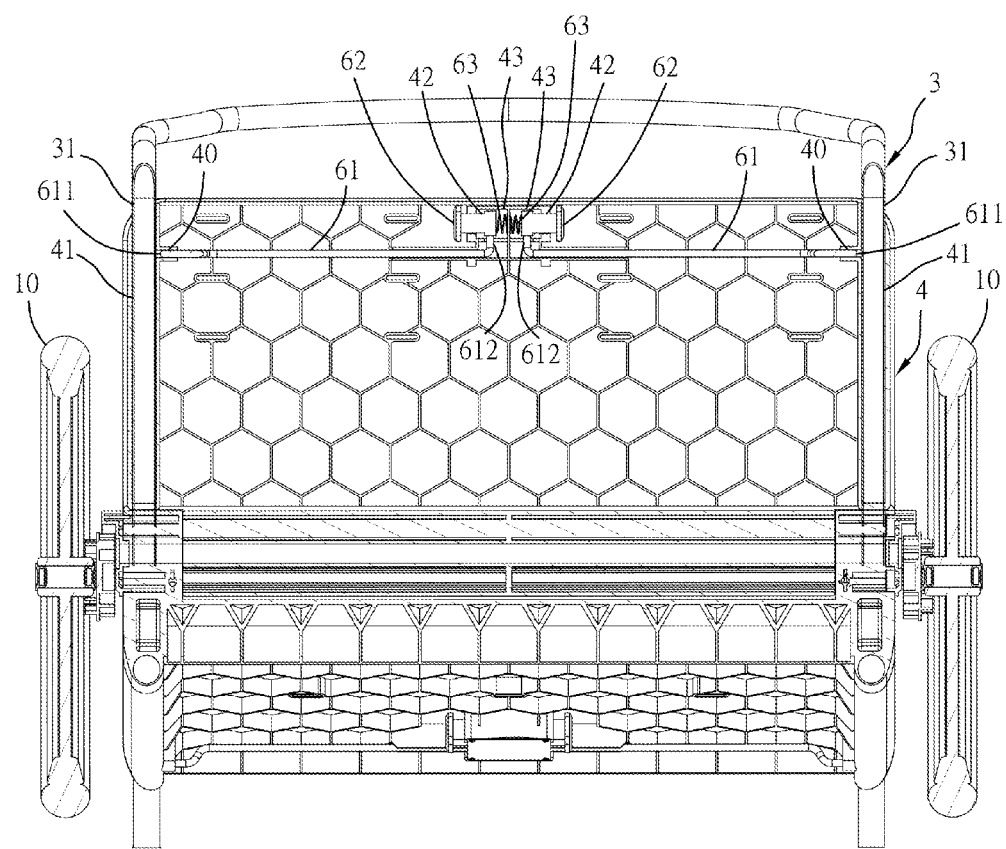
FIG. 6 is a schematic sectional view of the present invention, illustrating the top frame bar received in the backrest.
Figure 7:
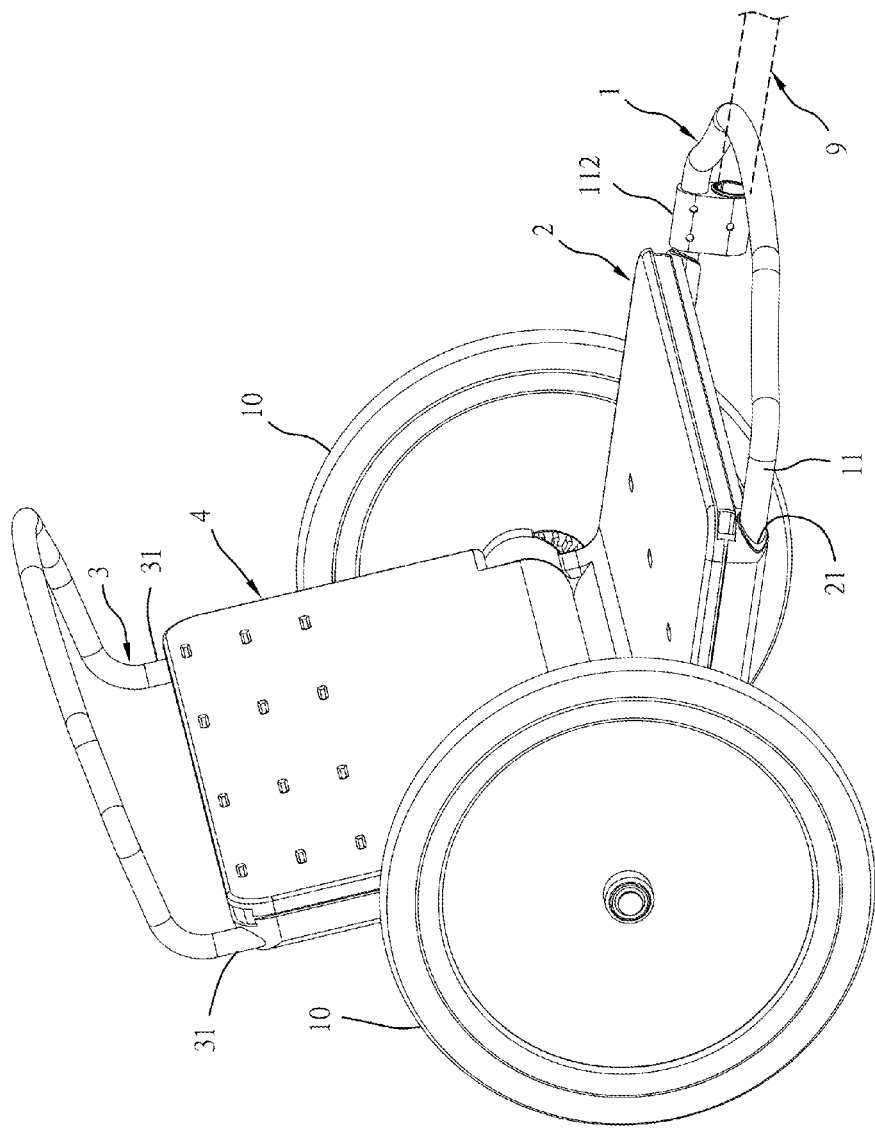
FIG. 7 is an elevational view of the present invention, illustrating the bottom frame bar received in the base frame and the top frame bar received in the backrest.
Figure 8:
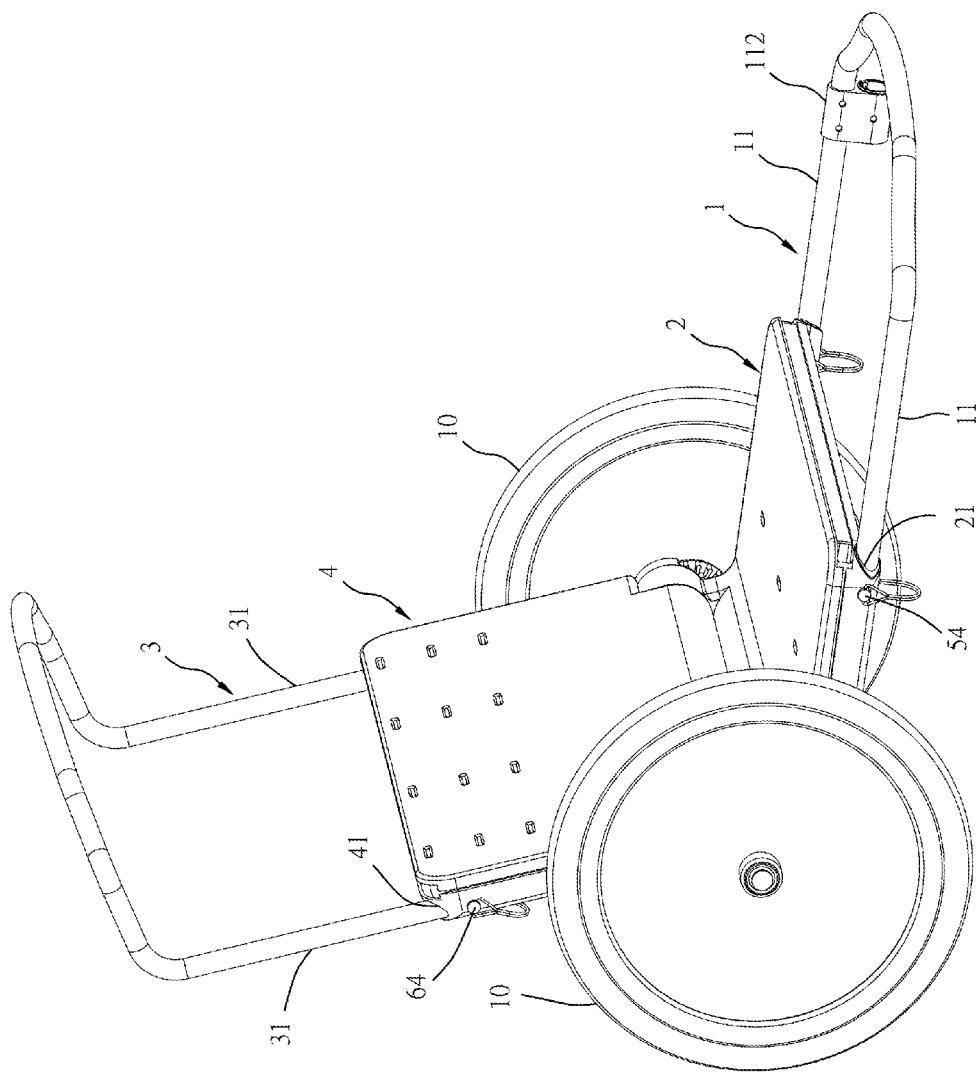
FIG. 8 is an elevational view of an alternate form of the present invention, illustrating safety lock pins used for the first and second lock means.
Figure 9:
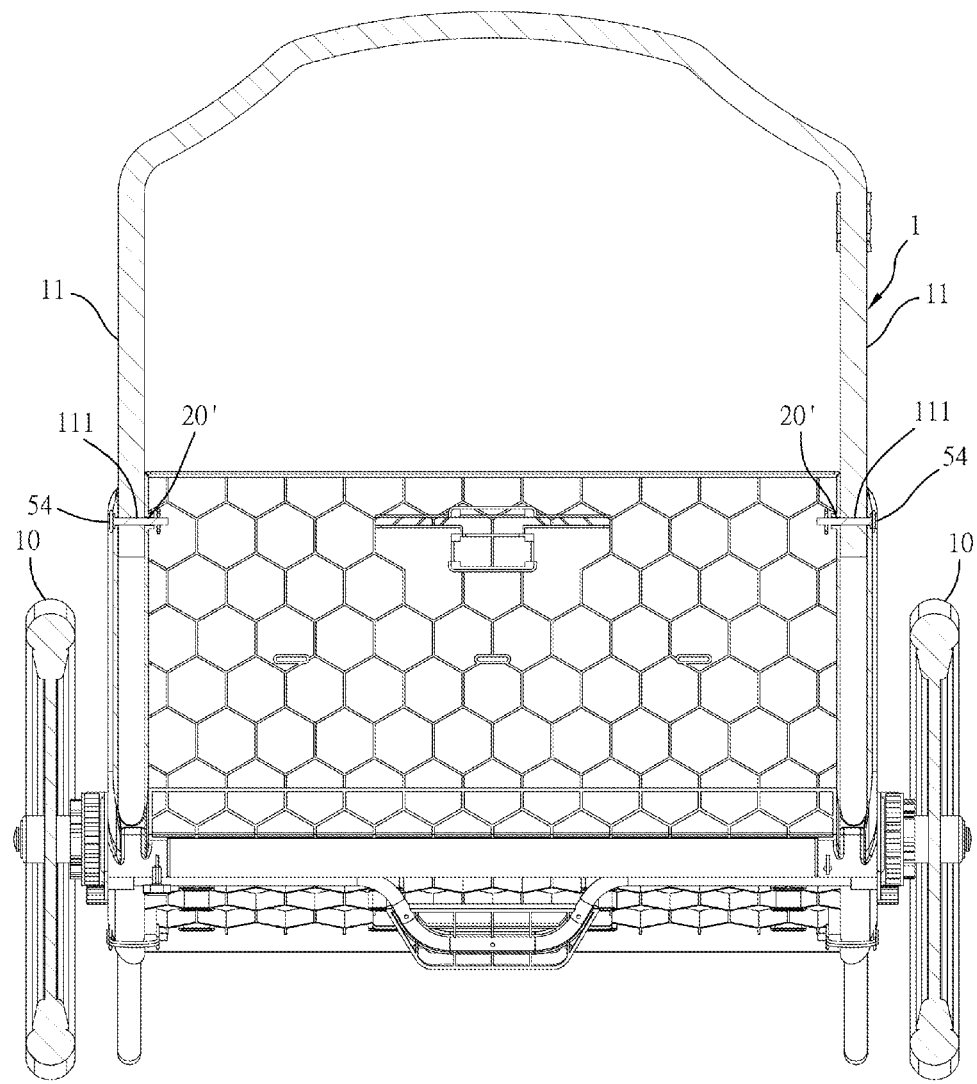
FIG. 9 is a schematic sectional view of the alternate form of the present invention, illustrating safety lock pins used for the first and second lock means.
Figure 10:
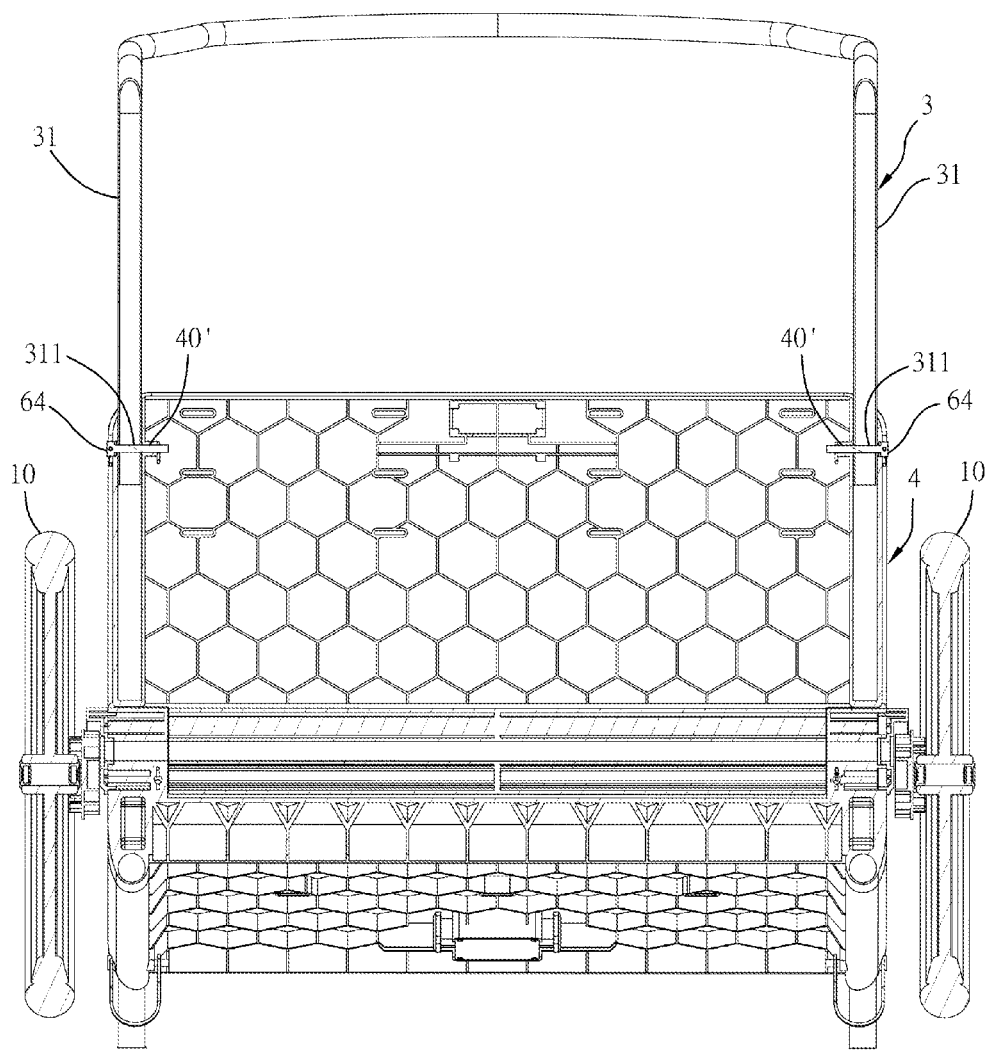
FIG. 10 is another schematic sectional view of the alternate form of the present invention, illustrating safety lock pins used for the first and second lock means.

Based on the composition of the aforesaid component parts, the user simply needs to press the two finger knobs 52 inwardly toward each other to compress the respective spring members 53, forcing the two lock pins 51 to disengage their respective one ends 511 from the positioning holes 111 of the frame bar portions 11 of the bottom frame bar 1 (see FIG. 4). At this time, the user can move the bottom frame bar 1 to force the frame bar portions 11 backwardly into the inside of the two sliding holes 21 of the base frame 2 (see FIG. 5), and thus the bottom frame bar 1 is received in the base frame 2. Similarly, the user can press the two second finger knobs 62 inwardly toward each other to compress the second spring member 63, forcing the second lock pins 61 to disengage their respective one ends 611 from the second positioning holes 311 in the frame bar portion 31 of the top frame bar 3. At this time, the user can move the top frame bar 3 to force the two frame bar portions 31 downwardly into the inside of the two sliding holes 41 of the backrest 4 (see FIG. 6). Thus, the bottom frame bar 1 and the top frame bar 3 are respectively set in the received condition, saving further the space. Further, because the base frame 2 and the backrest 4 are pivotally connected together, the user can receive the base frame 2 and the backrest 4 in a stacked condition, saving storage space. When wishing to extend out of the retractable frame structure, the operation is also very convenient. At this time, directly pull the bottom frame 1 outward, enabling the two lock pins 51 to be forced by the respective spring members 53 into the positioning holes 111 in the two frame bar portions 11 of the bottom frame bar 1 (see FIG. 2). Similarly, the user can directly upwardly pull the top frame bar 3, enabling the two second lock pins 61 to be forced by the respective second spring members 63 into the second positioning holes 311 in the two frame bar portions 31 of the top frame bar 3 (see FIG. 3).

Referring to FIGS. 8-11, in an alternate form of the present invention, the aforesaid first lock means comprises two first safety lock pins 54 respectively inserted through respective third locating holes 20' in the base frame 2 (see FIG. 9) into selected positioning holes 111 in the frame bar portions 11 of the bottom frame bar 1 to lock the base frame 2 and the bottom frame bar 1 together; the second lock means comprises two second safety lock pins 64 (see FIG. 10) respectively inserted through respective fourth locating holes 40' in the backrest 4 (see FIG. 10) into selected second positioning holes 311 in the two frame bar portions 31 of the top frame bar 3 to lock the backrest 4 and the top frame bar 3 together.

Figure 11:
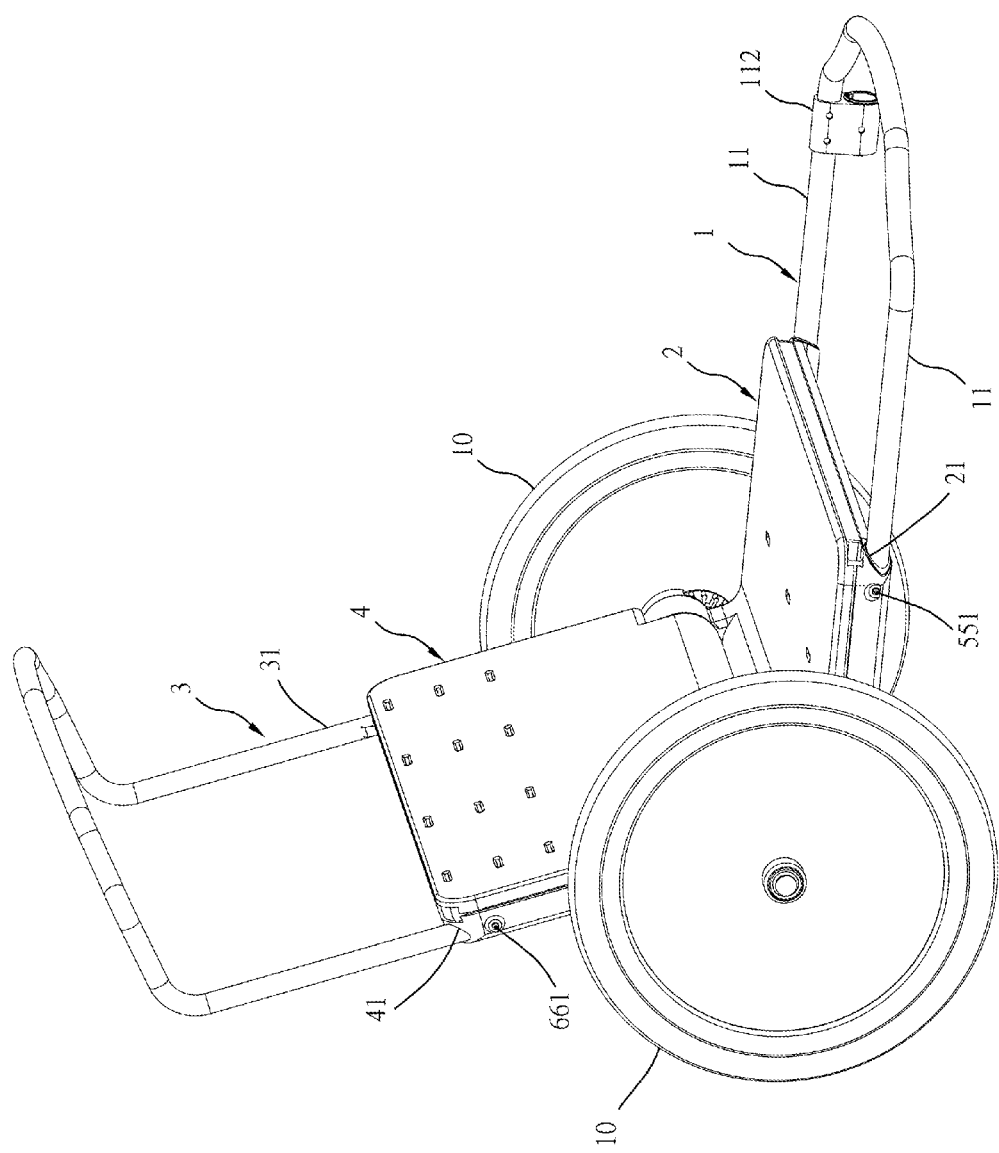
FIG. 11 is an elevational view of another alternate form of the present invention, illustrating safety lock pins used for the first and second lock means.
Figure 12:
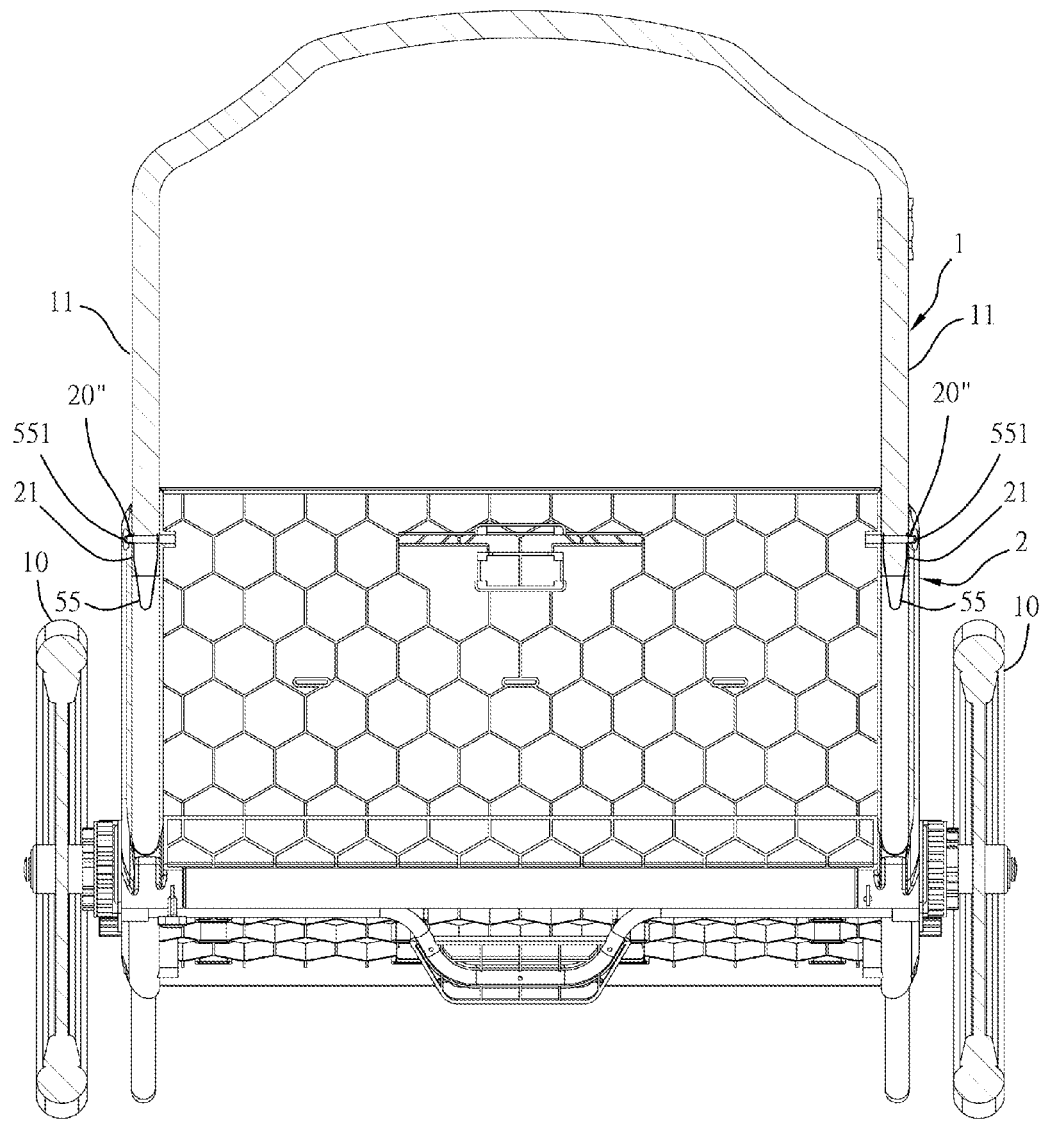
FIG. 12 is a schematic sectional view of the retractable frame structure shown in FIG. 11, illustrating safety lock pins used for the first and second lock means.
Figure 13:
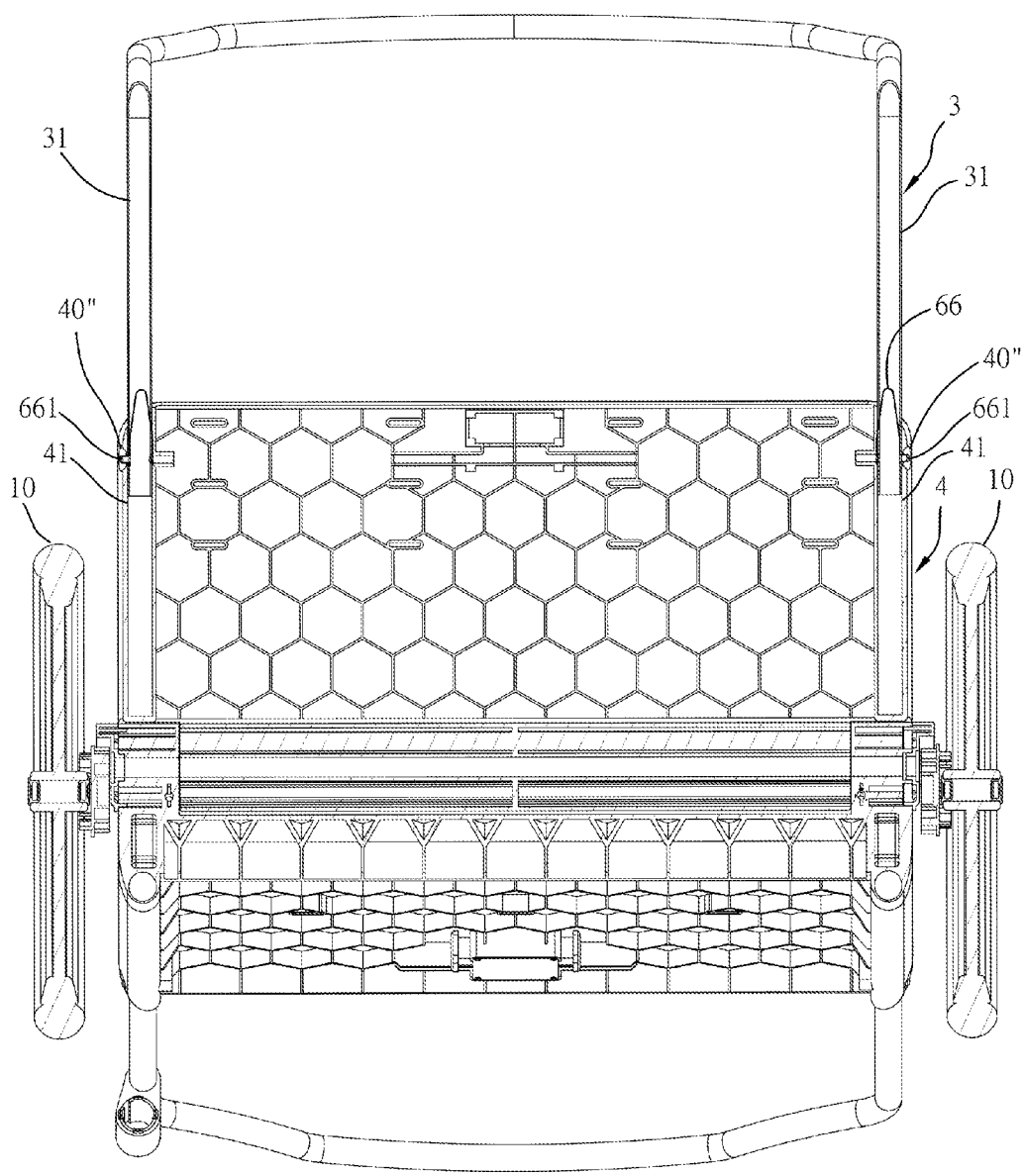
FIG. 13 is another schematic sectional view of the retractable frame structure shown in FIG. 11, illustrating safety lock pins used for the first and second lock means.

Referring to FIGS. 11-13, in another alternate form of the present invention, the aforesaid first lock means comprises two spring pins 55 respectively mounted in the two frame bar portions 11 of the bottom frame bar 1 (see FIG. 12). The spring pins 55 each comprise a protruding portion 551 normally engaged in a respective fifth locating hole 20" in the base frame 2 to lock the bottom frame bar 1 and the base frame 2 together. When pressing the protruding portions 551 of the spring pins 55 in direction away from the respective fifth locating hole 20" in the base frame 2, the bottom frame bar 1 is unlocked from the base frame 2 and can be moved relative to the base frame 2. Further, in this embodiment, the aforesaid second lock means also comprises two second spring pins 66 respectively mounted in the two frame bar portions 31 of the top frame bar 3 (see FIG. 13). The second spring pins 66 each comprise a protruding portion 661 normally engaged in a respective sixth locating hole 40" in the backrest 4 to lock the top frame bar 3 and the backrest 4 together. When pressing the protruding portions 661 of the second spring pins 66 in direction away from the respective sixth locating hole 40" in the backrest 4, the top frame bar 3 is unlocked from the backrest 4 and can be moved relative to the backrest 4.

Figure 14:
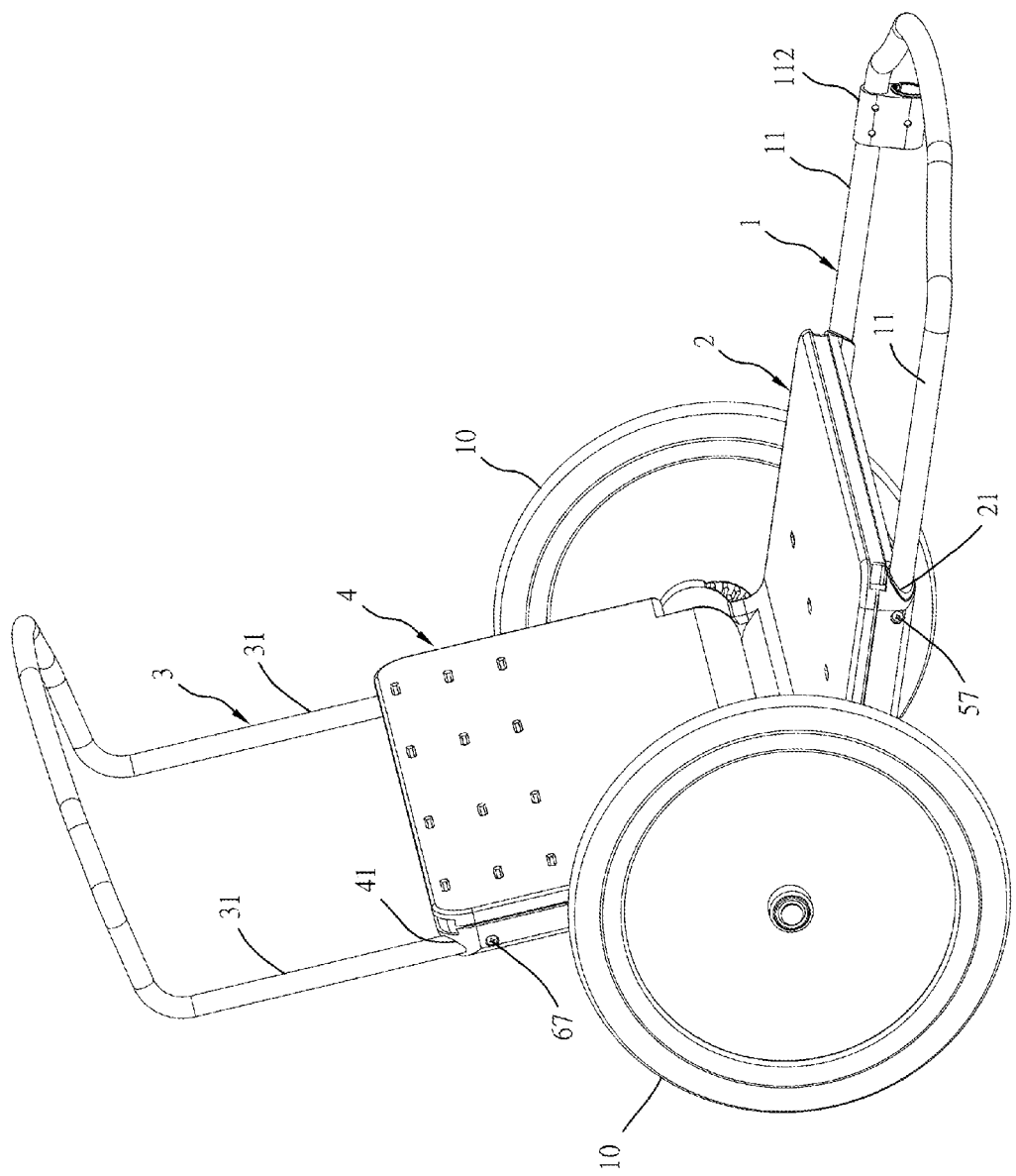
FIG. 14 is an elevational view of still another alternate form of the present invention, illustrating safety lock pins used for the first and second lock means.
Figure 15:
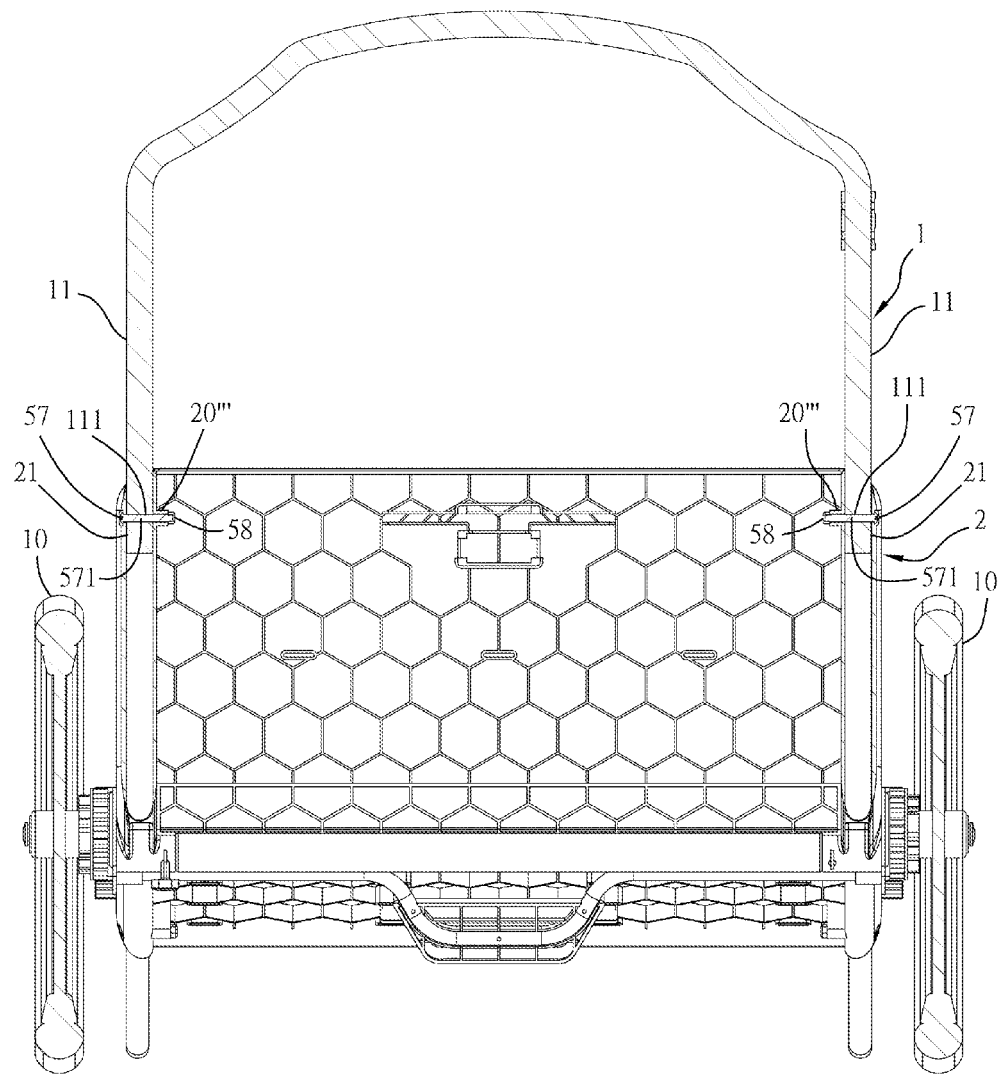
FIG. 15 is a schematic sectional view of the retractable frame structure shown in FIG. 14, illustrating safety lock pins used for the first and second lock means.
Figure 16:
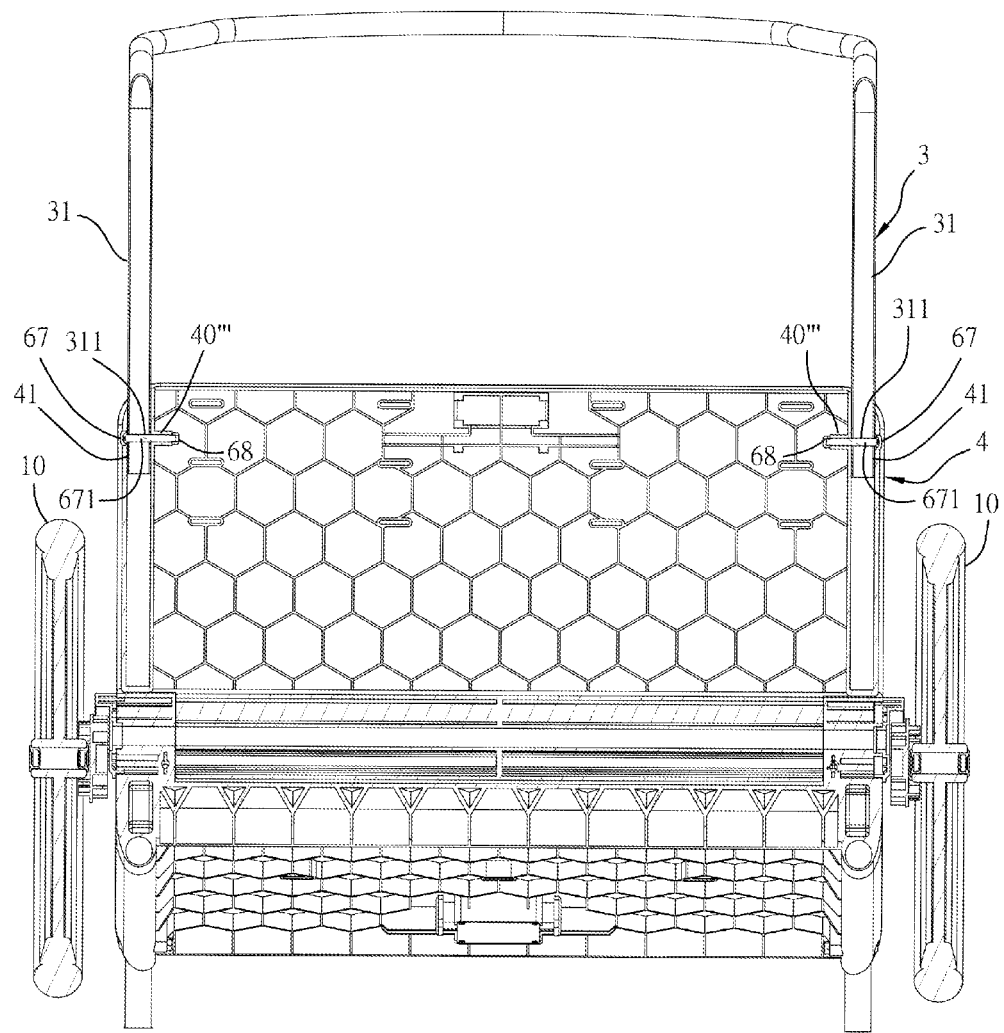
FIG. 16 is another schematic sectional view of the retractable frame structure shown in FIG. 14, illustrating safety lock pins used for the first and second lock means.

Referring to FIGS. 14-16, in still another alternate form of the present invention, the aforesaid first lock means comprises two screw bolts 57 and two screw nuts 58 (see FIG. 15). The threaded shanks 571 of the screw bolts 57 are respectively inserted through respective seventh locating holes 20''' in the two frame bar portions 11 of the bottom frame bar 1, and then the two screw nuts 58 are respectively threaded onto the threaded shanks 571 of the screw bolts 57 to lock the bottom frame bar 1 and the base frame 2 together. When removed the screw nuts 58 from the respective screw bolts 57, the bottom frame bar 1 is unlocked from the base frame 2 and can be moved relative to the base frame 2. Further, in this embodiment, the aforesaid second lock means also comprises two second screw bolts 67 and two second screw nuts 68. The threaded shanks 671 of the second screw bolts 67 are respectively inserted through respective eighth locating holes 40''' in the backrest 4 and respective second positioning holes 311 in the two frame bar portions 31 of the top frame bar 3, and then the second screw nuts 68 are respectively threaded onto the threaded shanks 671 of the second screw bolts 67 to lock the top frame bar 3 and the backrest 4 together. When removed the second screw nuts 68 from the respective second screw bolts 67, the top frame bar 3 is unlocked from the backrest 4 and can be moved relative to the backrest 4.

In conclusion, the invention provides a retractable frame structure for baby trailer, which has the advantages and features as follows:

1. The base frame 2 is a rigid frame strong enough to bear the baby thereon and will not be deformed to strike against a large stone or other external objects when moving, assuring a high level of safety; the base frame 2 has sliding holes 21 in the front-back direction for receiving the two frame bar portions 11 of the bottom frame bar 1 between an extended operative position and a received non-operative position to reduce the storage space; the backrest 4 has sliding holes 41 for receiving the two frame bar portions 31 of the top frame bar 3 between an extended operative position and a received non-operative position to reduce the storage space; thus, the base frame 2 and the top frame bar 3 can be respectively moved relative to the bottom frame bar 1 and the backrest 4 between an extended operated position and a received non-operative position to reduce the storage space, saving the packaging and delivery costs of the baby trailer; further, the base frame 2 and the backrest 4 can be folded up to reduce the storage space, further saving the packaging and delivery costs of the baby trailer.
2. The user can press the two finger knob 52 to disengage the lock pins 51 from the positioning holes 111 in the two frame bar portions 11 of the bottom frame bar 1 and to let the two frame bar portions 11 of the bottom frame bar 1 be received in the base frame 2; in the same manner, the user can press the two second finger knob 62 to disengage the second lock pins 61 from the second positioning holes 311 in the frame bar portions 31 of the top frame bar 3 and to let the two frame bar portions 31 of the top frame bar 3 be received in the backrest 4; when wishing to extend out of the retractable frame structure of the baby trailer, the user can directly pull the bottom frame bar 1 outwardly from the received non-operative position to the extended position and directly pull the top frame bar 3 upwardly from the received non-operative position to the extended position.

What is claimed is:

1. A retractable frame structure for baby trailer comprising:
   a bottom frame bar comprising opposing left and right frame bar portions disposed in a parallel manner, a plurality of positioning holes respectively located in the left and right frame bar portions of said bottom frame bar and spaced along the length thereof, a pivot holder located at one of the left and right frame bar portions of said bottom frame bar for the connection of one end of a tow bar;
   a base frame made of a rigid material and pivotally connected between two wheels, said base frame comprising two sliding holes arranged in parallel at opposing left and right sides thereof for receiving the left and right frame bar portions of said bottom frame bar respectively in such a manner that said bottom frame bar is movable in and out of the sliding holes of said base frame between a received position and an extended position, and first lock means for locking said bottom frame bar to said base frame;
   a top frame bar comprising opposing left and right frame bar portions, a plurality of second positioning holes located in the left and right frame bar portions of said top frame bar and spaced along the length thereof; and
   a backrest pivotally connected with a bottom side thereof to a rear side of said base frame and turnable relative to said base frame between a non-operative horizontal position and an operative vertical position, said backrest comprising two second sliding holes arranged in parallel at opposing left and right sides thereof for receiving the left and right frame bar portions of said top frame bar respectively in such a manner that said top frame bar is movable in and out of said second sliding holes of said backrest between a received position and an extended position, and second lock means for locking said top frame bar to said backrest.

2. The retractable frame structure for baby trailer as claimed in claim 1, wherein said base frame comprises two opposing locating holes; said first lock means comprises two lock pins respectively insertable with respective one ends thereof through the locating holes of said base frame into selected positioning holes in the left and right frame bar portions of said bottom frame bar to lock said base frame and said bottom frame bar together.

3. The retractable frame structure for baby trailer as claimed in claim 2, wherein said first lock means further comprises two finger knobs respectively connected to respective opposite ends of said two lock pins and movably mounted in respective sliding grooves in said base frame, and two spring members respectively mounted in respective spring holes in said base frame and respectively stopped against said finger knobs to support said finger knobs in the position where said lock pins lock said base frame and said bottom frame bar together.

4. The retractable frame structure for baby trailer as claimed in claim 1, wherein said backrest comprises two opposing second locating holes; said second lock means comprises two second lock pins respectively insertable with respective one ends thereof through the second locating holes of said backrest into selected positioning holes in the left and right frame bar portions of said top frame bar to lock said backrest and said top frame bar together.

5. The retractable frame structure for baby trailer as claimed in claim 4, wherein said second lock means further comprises two finger knobs respectively connected to respective opposite ends of said two second lock pins and movably mounted in respective second sliding grooves in said backrest, and two second spring members respectively mounted in respective second spring holes in said backrest and respectively stopped against said second finger knobs to support said second finger knobs in the position where said second lock pins lock said backrest and said top frame bar together.

6. The retractable frame structure for baby trailer as claimed in claim 1, wherein said first lock means comprises two safety lock pins respectively inserted through respective third locating holes in said base frame into selected positioning holes in the left and right frame bar portions of said bottom frame bar to lock said base frame and said bottom frame bar; said second lock means comprises two second safety lock pins respectively inserted through respective fourth locating holes in said backrest into selected second positioning holes in the left and right frame bar portions of said top frame bar to lock said backrest and said top frame bar together.

7. The retractable frame structure for baby trailer as claimed in claim 1, wherein said first lock means comprises two spring pins respectively mounted in the left and right frame bar portions of said bottom frame bar, each said spring pin comprising a protruding portion detachably engaged into a respective fifth locating hole in said base frame to lock said base frame and said bottom frame bar together; said second lock means comprises two second spring pins respectively mounted in the left and right frame bar portions of said top frame bar, each said second spring pin comprising a protruding portion detachably engaged into a respective sixth locating hole in said backrest to lock said backrest and said top frame bar together.

8. The retractable frame structure for baby trailer as claimed in claim 1, wherein said first lock means comprises two screw bolts respectively respective seventh locating holes in said base frame and selected positioning holes in the left and right frame bar portions of said bottom frame bar, and two screw nuts respectively threaded onto said screw bolts to lock said base frame and said bottom frame bar together; said second lock means comprises two second screw bolts respectively inserted through respective eighth locating holes in said backrest and selected second positioning holes in the left and right frame bar portions of said top frame bar, and two screw nuts respectively threaded onto said second screw bolts to lock backrest and said top frame bar together.

\* \* \* \* \*